United States Patent Office 2,847,308
Patented Aug. 12, 1958

2,847,308

METHOD FOR THE REMOVAL OF HEAVY METAL IONS FROM FOOD BEVERAGES

Frederick C. Bersworth, East Orange, N. J., and Albert E. Frost, Millis, Mass., assignors, by direct and mesne assignments, to The Dow Chemical Company, Midland, Mich., a corporation of Delaware No Drawing. Application June 26, 1953
Serial No. 364,493

7 Claims. (Cl. 99—48)

This invention relates to a method for the removal of heavy metal ions from food beverages in general and wines in particular.

The detrimental effects of heavy metal ions in food beverages, such as wines, milk, fruit juices and vegetable juices, have been known for many years. With the exception of wines, methods for overcoming or eliminating the heavy metal ions from food beverages are of relatively recent origin. This is due to the ancient origin of wine and the nature of the beverage.

The presence of iron and/or copper ions in wines produces a haze or cloud commonly referred to as a "casse." This "casse" can be eliminated by any of several fining agents, such as tannin, gelatin, casein, isinglass and bentonites, as well as blood, soybeans, eggs, wheatbran and sawdust. The effectiveness of these fining agents, however, is dependent upon how much of the iron is present as ferric iron. These agents probably function by combining with, or by electrically precipitating the ferric compounds.

The treatment most widely used in Europe today is that of "blue-fining." This treatment consists in precipitating the copper and iron by the addition of potassium ferrocyanide and removing the precipitate by filtration. However, this method is subject to considerable controversy because of the opportunity of forming hydrocyanic acid by hydrolysis of the ferrocyanide radical.

More suitable methods for eliminating the metal "casse" in wines have recently been reported. These methods involve the use of chelating or sequestering agents which form stable, soluble, non-toxic chelates with the divalent and trivalent metal ions. The sequestering agents which are useful in this respect are the polyphosphates and the synthetic aminopolycarboxylic acids of which ethylenediamine tetraacetic acid is the most useful and best known.

The salient feature of such treatments over those using bentonites, sawdust, potassium ferrocyanide, etc. is the fact that both bivalent and trivalent metals are effectively bound up and removed from the role of contaminating ions.

With such a treatment, the recurrence of a metal "casse" is eliminated, since all forms of the metal ions are bound up and effectively removed from their role as precipitants. However, the non-ionic compound formed, although inert and non-toxic is present in the products so protected (in this case, wine). It is not totally inert, but in wine will still form a precipitate due probably to agglomeration of the minute solids or colloids present in wines.

The detrimental effects of heavy metal ions, copper in particular, on systems containing ascorbic acid are well-known. Inasmuch as ascorbic acid is so important, a dietary factor and is present in a wide variety of foods, it is imperative that food beverages containing ascorbic acid be protected so as to retain as high an anti-scorbutic activity as possible. The normal protective influences in certain fruit and vegetable juices and cows milk are not sufficient to protect the fluid fully against copper catalyzed oxidation. Other effects of heavy metal ions, namely discoloration, toxicity, and impairment of flavor and nutritional value of food beverages result in decreased salability and shelf-life.

It is, accordingly, a general object of this invention to provide a method for the removal of heavy metal ions from food beverages.

More specifically, it is an object of this invention to provide a method for the removal of heavy metal ions which cause toxicity, discoloration, and impairment of flavor and nutritional value of foodstuffs.

It is a further object of this invention to provide a method for the production of stable ascorbic acid-containing food beverages.

In particular, it is an object of this invention to make provisions for the removal of polyvalent heavy metal ions, especially copper and iron, from wines.

We have found that heavy metal ions can be effectively removed from edible media if the medium is converted to liquid form and brought into intimate contact with the calcium salt of the calcium chelate or the dihydrogen calcium chelate of a compound corresponding to the following generic formula, the compounds being characterized by the fact that they are simple organic acid derivatives of ammonia:

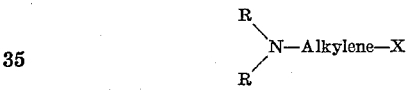

wherein R is an acetic or propionic acid residue, an alkali metal salt thereof or an ammonium base salt thereof, X is —COOM, —CH₂COOM,

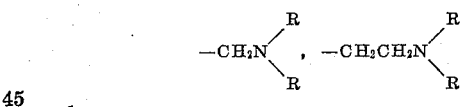

and

and alkylene is a low molecular weight alkyl group such that the carbon chain will contain 2–3 carbon atoms, e. g., methylene, ethylene, isopropylene, cyclohexylene.

A characteristic of these compounds is that a combination of carbon, nitrogen and oxygen atoms is present in the nucleus which will react with polyvalent metal ions to form a compound having a plurality of inner rings, thereby to render the metal inactive and non-ionic. The alkaline earth salts and dihydrogen salts of the alkaline earth chelates of compounds conforming to this structure are insoluble in aqueous media and by utilizing the property of these compounds, which renders them preferentially reactable with heavy metal ions, it is possible by reacting an aqueous medium containing heavy ions with the given water insoluble chelate salt, to remove from the aqueous medium metal ions and replace them with ions from the isoluble chelate compound. For the processing of food products, it, of course, is undesirable to add toxic ions to a food beverage and accordingly in the removal of detrimental heavy metal ions contaminating the beverage, the calcium chelate is the preferred strengthening material. It may be used as the dihydrogen calcium chelate, the calcium salt of the calcium chelate, or as the alkaline earth metal salt of the calcium chelate.

Upon reaction of the calcium chelate with metal ions of the food beverage, an exchange takes place, calcium is added to the solution with an accompanying removal of the metal ions, the process accordingly is embodied in the operation of removing metal ions from food products characterized by the steps and combination of steps and their relation each to the other as may be hereinafter set forth.

The above stated objects of this invention are accomplished by bringing the food beverages into intimate contact with the insoluble calcium calcium chelate or dihydrogen calcium chelate of ethylenediamine tetraacetic acid.

The calcium chelate functions in a manner analogous to that of the ion exchange resins now in commerce. In fact, these salts may be considered as ion exchange materials or chelates since the chelated calcium atom can be replaced by a metal ion which forms a stronger chelate with the aminopolycarboxylic acid than does calcium.

The heavy metal ions form stronger chelates with ethylenediamine tetraacetic acid than does calcium. As a result, when a food beverage which is contaminated with a heavy metal ion, for example, copper, is brought into intimate contact with the calcium salt of the calcium chelate, an ion exchange takes place. The heavy metal ion, for example, copper, replaces the chelated calcium ion forming the calcium copper chelate which is also water insoluble. An equivalent amount of calcium is released to the food beverage. The released calcium exerts no harmful effects since as a rule only small quantities will be released. The released calcium may be considered as food calcium in which instance it is nutritional and beneficial to the beverage.

The purposes of this invention may be accomplished in either of two ways: by allowing the food beverage to percolate through a bed of the calcium calcium salt or by adding the calcium calcium salt to the food beverage to form a slurry and thoroughly agitating; the food beverage is then isolated by filtration or centrifugation.

In carrying out this invention, best results are obtained when a large excess of the calcium salt of calcium ethylenediamine tetraacetate is used. The use of an excess of the calcium calcium salt results in a more effective removal of the contaminating heavy metal ions.

Food beverages which have been treated according to the method of this invention have increased shelf-life, improved appearance and palatability, and maintain their anti-scorbutic activity for longer periods.

In order to permit fuller understanding of the invention, the following examples are given. It must be mentioned that the calcium calcium salts and dihydrogen calcium salts of other aminopolycarboxylic acids, such as nitrilo triacetic acid, isopropylenediamine tetraacetic, 1,2-diaminocyclohexane tetraacetic acid, are operative in this invention.

In the examples listed below samples of commercial white port and Sauterne wines, to which known amounts of a one percent ferric chloride solution were added to give from 10 to 100 p. p. m. ferric ion, were used.

*Example 1*

To a white wine containing 100 p. p. m. iron there was added 5.0 gm. (excess) of the calcium salt of calcium ethylenediamine tetraacetate. The suspension was stirred for one-half hour and then filtered with suction. The clear white wine was then stored in a tightly stoppered bottle for several weeks. No sediment or cloudiness was observed whereas a typical iron "casse" appeared in a control sample. Taste panels could detect no unfavorable taste characteristics.

*Example 2*

A sample of the same wine as used in Example 1 but containing 50 p. p. m. iron was allowed to stand in the dark in a tightly stoppered bottle until a heavy sediment had settled out. Two grams of the calcium salt of calcium ethylenediamine tetraacetate was then added and the sample thoroughly agitated for one hour and then filtered with suction. The filtrate was a clear sparkling white. Taste panels and short term storage revealed no unfavorable characteristics in the wine.

*Example 3*

To a commercial Sauterne wine containing a copper "casse" there was added 5.0 grams of the calcium salt of calcium ethylenediamine tetraacetate. The mixture was thoroughly agitated for 4 hours to permit oxidation of the cuprous copper to cupric copper. The mixture was then filtered with suction to give a clear wine in the filtrate.

To determine if all the copper had been removed, nitrogen was bubbled through the wine to remove the included oxygen and the wine was then stored in a tightly stoppered bottle for several weeks. No further cloudiness was observed, indicating complete removal of the copper contamination.

*Example 4*

To a sample of milk having 10 p. p. m. of copper, there was added 10.0 grams of the calcium salt of calcium ethylenediamine tetraacetate. The mixture was stirred rapidly for one hour and then filtered. No copper was detected in the filtrate. The ascorbic acid content of this sample was found to be more stable than that of a sample of the original milk.

*Example 5*

A white wine having 50 p. p. m. iron was percolated through a column of the calcium salt of calcium ethylenediamine tetraacetate. The column was 0.25 cm. in diameter and 3 cm. in height and contained 5 grams of the calcium calcium salt mixed with glass beads to prevent packing of the salt. The percolation was performed at the rate of 20 milliliters per hour.

Storage of the wine for several weeks produced no turbidity, indicating complete removal of the iron.

When food products are prepared it is common to utilize copper kettles, brass processing machinery and iron equipment somewhere in the system, so that traces of copper and iron inevitably appear in the product. Also, accordingly with the somewhat acidic food products containing their varied combinations of acids it is inevitable that traces of copper particularly are brought into solution.

Another source of copper in food products, is from the insecticides used to protect the food crop when it is in the fields.

Copper arsenates, Bordeaux mixtures and the like are common popular insecticides and despite all precautions at decontamination, cessation of operating many weeks before harvesting a crop, and the cleansing of the crop, it is inevitable that traces of the metals come through into the final product. Although the traces of metals in many instances are minute and probably non-toxic to the human system, they are present in sufficient amounts and in forms active enough to render them catalytic in their detrimental effects on the food product. As explained above, the formation of iron and copper "casses" in wines have a manifestation of oxidative phenomena entirely disproportionate to the quantity of metal ion which may be involved.

The reaction by which the calcium chelate functions to remove the metal ion from the food medium may be represented as follows:

Calcium calcium chelate (insoluble)    Metal ion

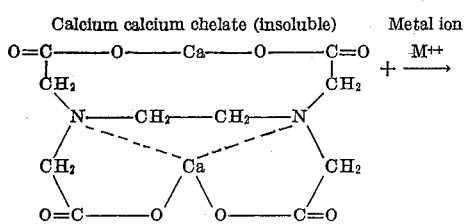 + M⁺⁺ →

Calcium metal chelate (insoluble)    Calcium ion

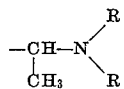 + Ca⁺⁺

It will be noted that the chelate remains insoluble as a mixed calcium heavy metal chelate and it releases calcium to the food medium.

Although the invention has been described in connection with only a few specific examples, its general utility in the processing of edible products may be readily understood and is not to be limited other than as defined in the accompanying claims.

What is claimed is:

1. The method of removing heavy metal ions from food products which comprises bringing the food products into intimate contact with a water insoluble calcium salt of a calcium chelate to exchange calcium for metal ion in the food, and subsequently separating the resulting insoluble chelate from the food product.

2. The method of removing heavy metal ions from beverages which comprises contacting the said beverage with a water insoluble calcium salt of a calcium chelate of a compound corresponding to the generic formula:

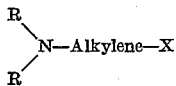

wherein R is from the group consisting of —CH₂COOH and —CH₂CH₂COOH, alkali metal salts thereof, and ammonium base salts thereof, X is from the group consisting of —COOM, —CH₂COOM,

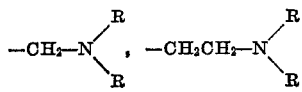

and $$-CH-N\begin{matrix}R\\ \\R\end{matrix}$$
$$\phantom{-CH-N}CH_3$$

M being from group consisting of alkali metals and ammonium bases; and Alkylene is a low molecular weight alkyl group which makes the carbon chain 2–3 carbon atoms in length; thereby in said contacting to form the insoluble heavy metal chelate by exchange of calcium for metal ion from the beverage, and separating said chelate from said beverage.

3. The method in accordance with claim 2, in which said chelate salt is maintained as a bed and said beverage is passed through said bed.

4. The method in accordance with claim 3 in which the chelate salt is the calcium salt of the calcium chelate of nitrilo triacetic acid.

5. The method in accordance with claim 3, in which the chelate salt is the calcium salt of the calcium chelate of ethylenediamine tetraacetic acid.

6. The method of removing copper and iron from wines in accordance with claim 2 which comprises mixing the wine with a calcium salt of the calcium chelate of nitrilo triacetic acid, maintaining said mixture until metal contamination of said wine is exchanged for calcium, and thereafter separating said chelate of nitrilo triacetic acid.

7. The method of removing copper and iron from wines in accordance with claim 2, which comprises mixing the wine with the calcium salt of the calcium chelate of ethylenediamine tetraacetic acid, maintaining said mixture until metal contamination of said wine is exchanged for calcium, and thereafter separating said chelate of ethylene diamine tetraacetic acid.

References Cited in the file of this patent

UNITED STATES PATENTS

| | | |
|---|---|---|
| 2,711,963 | Gray | June 28, 1955 |
| 2,748,002 | Kneen | May 29, 1956 |

FOREIGN PATENTS

| | | |
|---|---|---|
| 262,670 | Switzerland | Oct. 1, 1949 |

OTHER REFERENCES

Western Food Industries, July 1949, Pacific Coast Edition Food Industries, page W70, vol. 21, No. 7 (Abstract 106 "Sequestrene"—A New Agent for Clarifying Wines, Jack K. Krum, Food Technology Dept., University of Massachusetts, Amherst).